Figure 7:
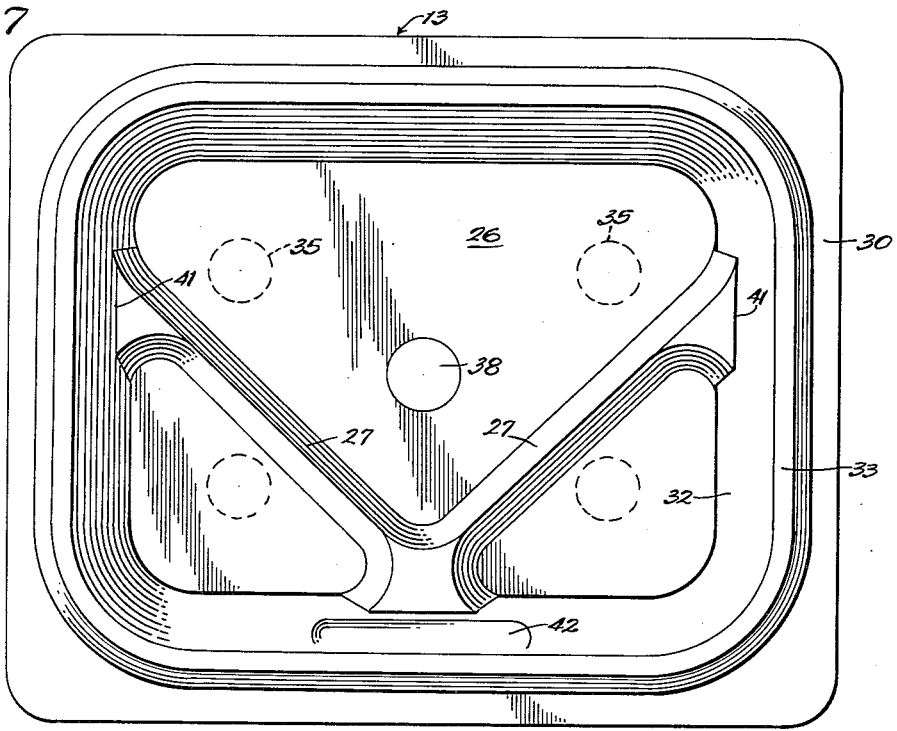

Aug. 28, 1956 T. ST. CLAIR 2,760,231
DIE ASSEMBLY FOR MOLDING HOLLOW STRUCTURES
Filed Jan. 17, 1952 3 Sheets-Sheet 1
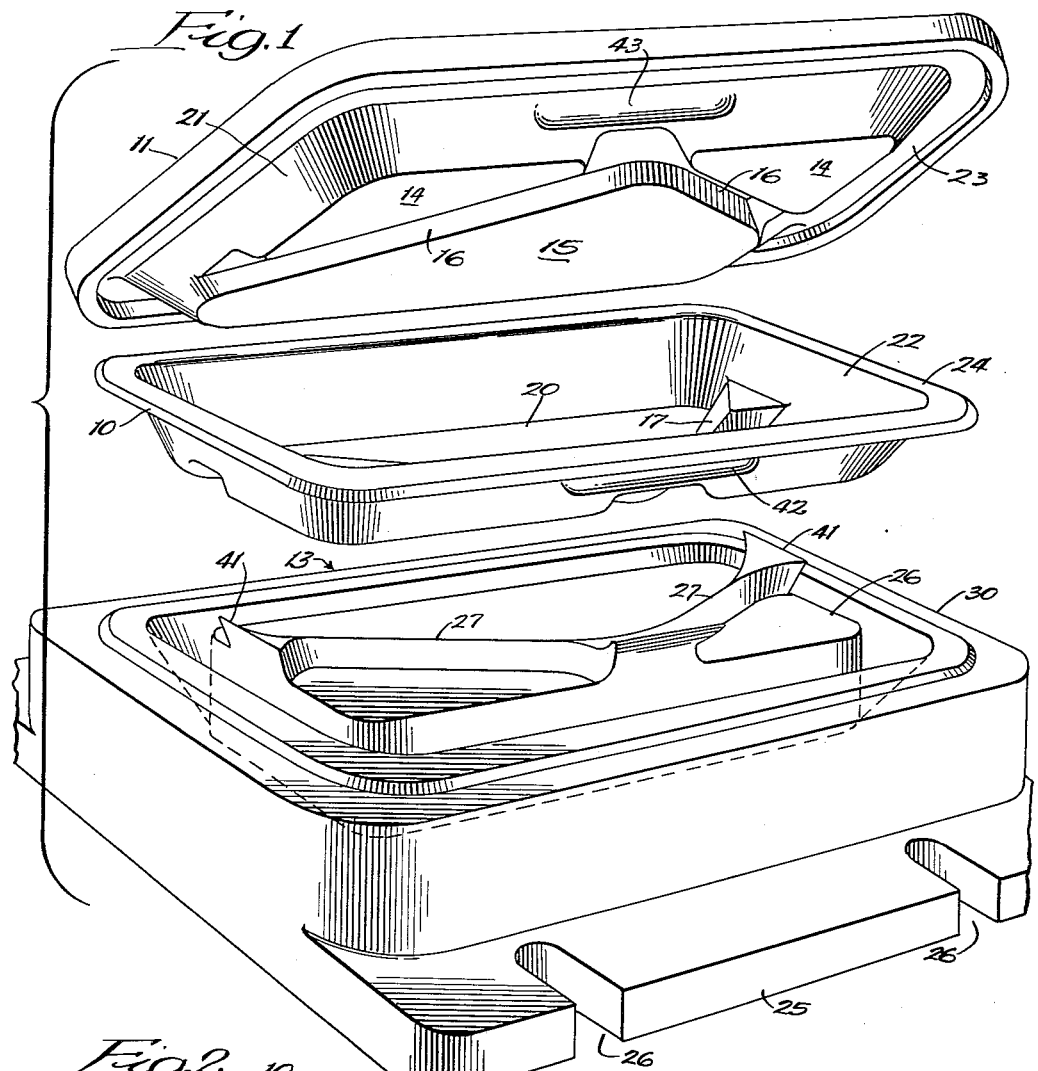
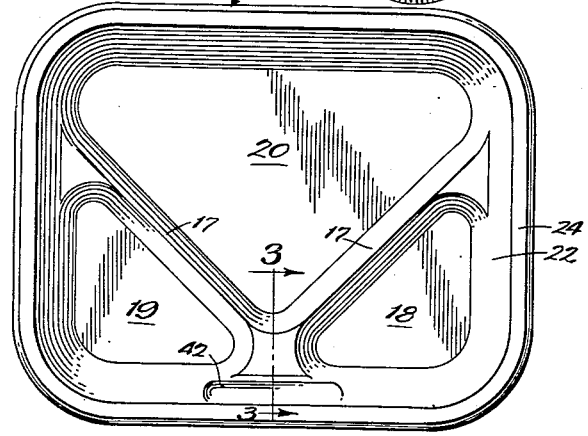
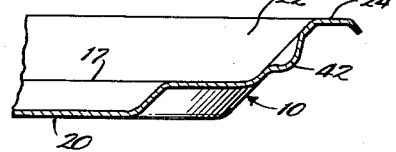
INVENTOR:
Truman St Clair,
BY
Dawson & Ooms,
ATTORNEYS.

Aug. 28, 1956 T. ST. CLAIR 2,760,231
DIE ASSEMBLY FOR MOLDING HOLLOW STRUCTURES
Filed Jan. 17, 1952 3 Sheets-Sheet 2
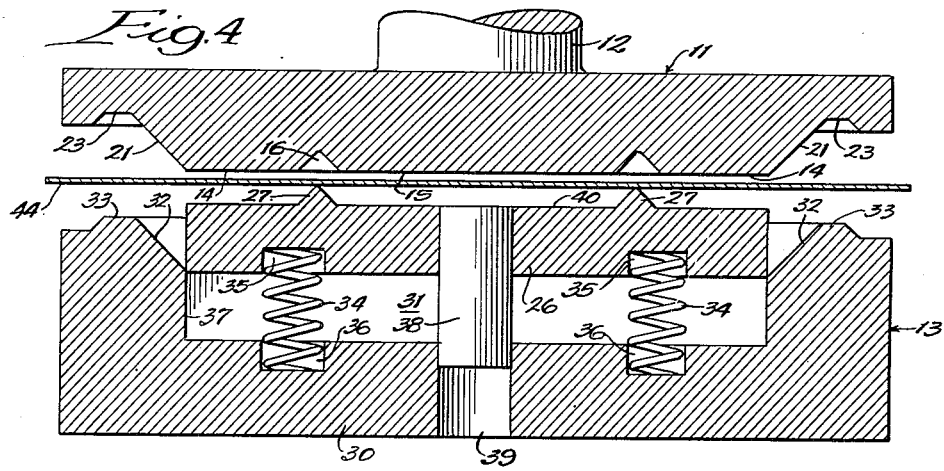
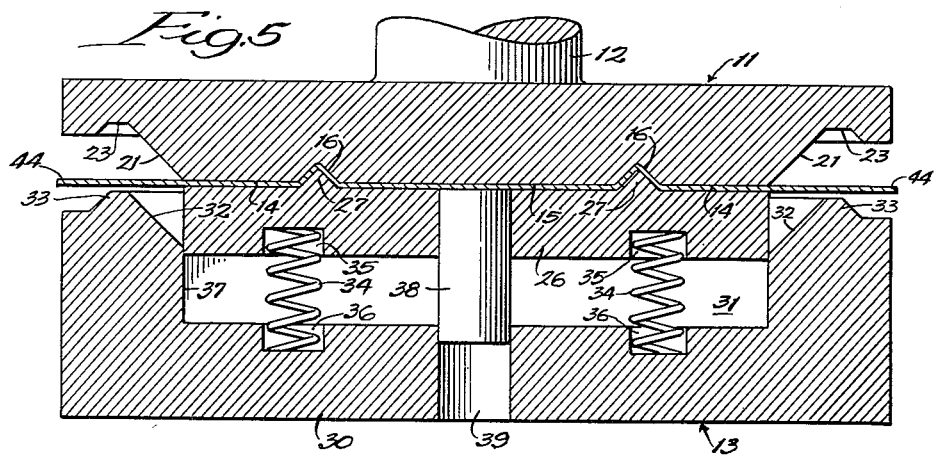
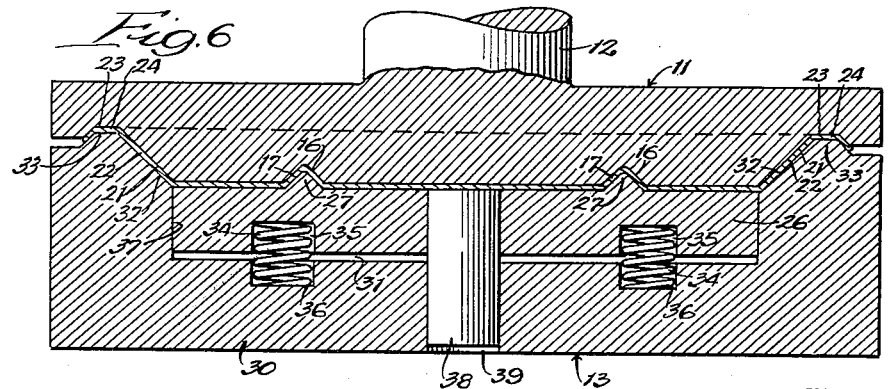
INVENTOR:
Truman St Clair,
BY
Dawson & Ooms,
ATTORNEYS.

Aug. 28, 1956  T. ST. CLAIR  2,760,231
DIE ASSEMBLY FOR MOLDING HOLLOW STRUCTURES
Filed Jan. 17, 1952  3 Sheets-Sheet 3

INVENTOR:
Truman St. Clair,
BY
Dawson & Ooms,
ATTORNEYS.

United States Patent Office 2,760,231
Patented Aug. 28, 1956

2,760,231
DIE ASSEMBLY FOR MOLDING HOLLOW STRUCTURES

Truman St. Clair, Chicago, Ill., assignor, by mesne assignments, to Continental Can Company, Inc., New York, N. Y., a corporation of New York Application January 17, 1952, Serial No. 266,904

1 Claim. (Cl. 18—19)

This invention relates to a die assembly for molding hollow articles of fibrous sheet stock and the like and relates more particularly to a die of the type described to mold sheet stock and form dished members thereof having ribs or embossed sections in the body portion thereof.

When structures of the type described are molded in the usual manner by compression of fibrous sheet stock and the like by the male and female die parts, thin sections or ruptures form in the body portion because the additional material required to form the embossed or rib portion is incapable of being properly supplied to the region thereof during molding. As a result, the additional material required to form the embossed portion must be taken from adjacent areas of the sheet stock, with the result that tears are likely to form therein or else uneven thin sections will be formed. In either event, the molded member is found to be unsuitable for use in the purpose for which it was intended. These difficulties are not faced by molding with compounds capable of plastic flow so as uniformly to fill the mold cavity during the molding operation.

It is an object of this invention to provide a new mold die for use in manufacturing structures of the type described, and it is a related object to provide a new and improved method for molding structures of the type described of fibrous sheet stock and the like.

Another object is to provide a mold assembly which may be economically manufactured and easily operated for molding fibrous sheet stock and the like into hollow structures for dished members having ribs or otherwise non-parallel sections in the body portion without causing ruptures, zones of weakness, or thin sections in the molded article.

A further object is to produce a mold assembly of the type described which is adapted to operate upon sheet stock to provide a sequence of steps and form the body portion while sheet material can be supplied in sufficient quantity for the proper formation thereof followed by the formation of the outer wall so as to produce a molded article of substantially uniform wall thickness and strength throughout.

Figure 8:
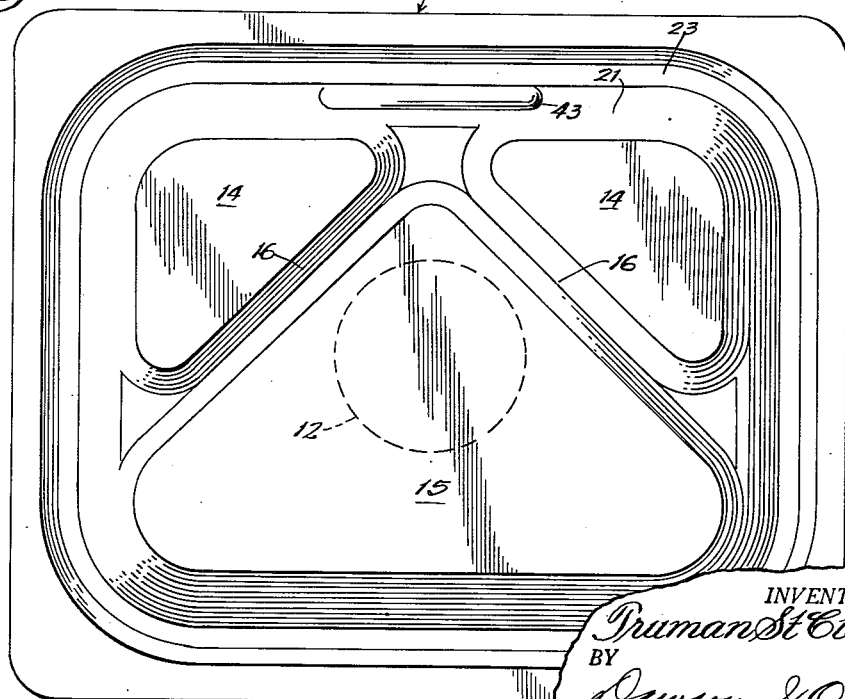

These and other objects and advantages of this invention will hereinafter appear, and for purposes of illustration, but not of limitation, an embodiment of the invention is shown in the accompanying drawings, in which Figure 1 is a perspective view of the die parts embodying features of this invention shown in their separated relation, with the molded article therebetween. Figure 2 is a top plan view of the sectional tray molded by the die assembly of Figure 1. Figure 3 is a sectional elevational view taken along the line 3—3 of Figure 2. Figure 4 is a sectional elevational view of the die parts shown in their relative position just prior to the start of the molding operation. Figure 5 is a sectional elevational view similar to that of Figure 4, showing the position of parts during an intermediate stage of the molding cycle. Figure 6 is a sectional elevational view similar to that of Figures 4 and 5, showing the relationship between parts upon completion of the molding cycle. Figure 7 is a top plan view of the female die part; and Figure 8 is a view taken from the underside of the male die part.

Briefly described, invention herein resides in a method and apparatus for molding the interior sections of an article in which ribs or embossed portions are formed in advance of the side wall portions so that sufficient of the molding material, such as sheet stock, can be supplied to form the ribber sections without the necessity of extracting the material from adjacent areas. After the interior portion containing the ribbed or embossed sections have been formed, the side wall sections or other edge portions of the hollow or dished member are molded to complete the molding cycle.

In accordance with the practice of this invention, the desired sequence of operations is secured by the use of a die assembly formed of the usual male and female mold parts but in which a portion forming the interior area of the molded article in which the ribbed or embossed sections are located is movable within its mold part in the direction toward and away from the other mold part and is constantly urged in the direction toward the other mold part with sufficient force to effect molding operations in cooperation therewith in advance of the actuation of the mold parts into their full molding relation.

Description herein of the inventive concepts will be addressed to a mold assembly for the manufacture of a sectional tray 10 from fibrous sheet stock, but it will be understood that the concepts of this invention may equally apply to the molding of other dished or hollow articles having grooved or ribbed sections or the like formed in interior portions thereof. The concepts of this invention are applicable to the molding of sheet stock having a high degree of mass integrity, such as sheet metal and sheets of plastic, but they have particular utility in the molding of fibrous sheet stock where the degree of fiber redistribution or fiber flow is highly limited to the extent that tearing will usually occur when a stretching force or other forces tending to cause redistribution of the fibers exists during molding. Fibrous sheet stock of the type described may have resinous material embodied therein to impart water repellency and high wet strength, or the surface thereof may be coated with a substantially continuous film of resinous material or other metallic or plastic film stock to impart resistance to the penetration of fluids which might be contained in food or other ingredients deposited upon the surface of the molded article.

As shown in the drawing, the male mold part 11 is operatively connected to a ram 12 for actuation in the direction toward and away from the female mold part 13 of the mold assembly. The mold surface 14 on the other side of the male mold part 11 is shaped to form the upper face of the molded tray 10 and is contoured in conformance therewith to have a central body portion 15 having a substantially flat surface with grooves 16 therein to form the partitioning ribs 17 which divide the body portion of the tray into separated sections 18, 19 and 20. The male mold part is formed to have an upwardly-inclined edge wall section 21 leading from the edge of the body portion to form the side walls 22 of the molded tray and a substantially horizontally disposed flat portion 23 which extends outwardly from the upper edge of the side wall forming portion to provide the flanged member 24 of the tray.

The female mold die 13 is supported on a mold plate 25 having grooves 26 in the edge wall portions for attachment onto the platen of a press as by means of hold-down bolts, or the like. The female mold die is formed of two sections including a central section 26 having a mold surface which includes the body portion of the tray and corresponds in contour to the counterpart of the body-forming portion 14 of the male mold die. In conformance with the contour of the body-forming portion of the male mold die, the female mold part 26 is provided with ribs 27 extending upwardly from the surface for cooperation with the grooves in the male mold part for embossing sectioning ribs 17 in the sheet stock adapted to be disposed therebetween during molding operations. The outer mold section 30 has a cavity 31 in the central portion thereof to permit the separated mold part 26 slidably to shift therein between extended and retracted positions of adjustment. The mold surface 32 extending outwardly from the cavity is inclined upwardly and then extends outwardly, as in 33 similar to that of the male mold part for cooperation therewith in the formation of the side wall portions and the flanged section of the service tray.

The movable mold part 26 of the female mold die is constantly urged toward its extended position of adjustment by a plurality of compression spring members 34, or the like, which are seated within registered openings 35 formed in the underside of the mold section 26 and 36 formed in the base of the cavity 31 in the female mold section 30. It is preferred to position the spring members 34 in a manner to balance the forces operating so that the effective forces will be substantially equal throughout the area of the mold part 26. As shown in the drawing, four such spring members are provided, but it will be sufficient if three or more are used.

The movable mold part 26 is guided during relative movement by reason of the contacting relation which constantly exists between the side walls of the movable mold part 26 and the wall portion 37 of the mold part 30 defining the cavity 31 and also by the guiding relation established between a guide post 38 depending from the central portion of the mold part 26 for sliding engagement through an opening 39 formed in a central portion of the mold section 30.

In its retracted or full molding relation, the mold surface 40 of the central plate portion 26 is adapted to be substantially continuous from the lower edge of the side wall forming portion 32 to cooperate with the mold surface of the male mold part in effecting the desired molding relation for forming the service tray. Movement beyond the retracted molding position is substantially prevented by extensions 41 from the rib-forming members 27, which extensions on their underside conform with the slope of the side wall forming portion for engagement therewith during molding operations. The overlapping portions described form sections of the rib members as they merge into the side wall portions and may, if desired, be fluted in their molding surface to provide reinforcing flutes in corresponding areas of the molded article.

Where such ribbed sections 17 merge into the side walls 22 and extend from opposite side walls or connect adjacent side walls, the ribbed members form lines about which the molded member may be bent with very little effort and, in fact, form pivotal lines of weakness which often permit the tray to collapse if held under load by one of the separated sections.

In order to obviate this tendency for buckling, embossed sections 42 are formed in the side wall portions to cross and extend in both directions beyond the line formed by an extension of the ribbed member or members as defined in the co-pending application of Truman St. Clair filed on this same date. The stiffening embossments are formed as by a horizontally-disposed groove 43 in one of the side wall forming portions of the male or female mold part and a corresponding rib in the mold surface of the other, preferably located directly above the point of mergence between the rib and the side walls and extending a distance beyond the line formed thereof in both directions.

In operation, a blank 44 of fibrous sheet stock to be molded is positioned between the male mold part and the female mold part. While the mold parts are separated for loading or unloading, the body-forming portion 26 of the female mold part 13 is urged to its extended position of adjustment by coil springs 34. As the male mold part 11 is actuated in the direction toward the female mold part to effect molding operations of the blank 44 located therebetween, a molding relation is first established between the male mold part 11 and the extended portion 26 of the female mold part urged to extended position with sufficient force to form the ribbed or embossed members 17 in the blank disposed therebetween. Since the ribbed or embossed sections are formed in the body portion before the edge portions of the blank are engaged by the mold dies to form the side walls, movement of the blank inwardly to supply the extra material to form the embossments or ribs is permitted so that the additional material need not be extracted from adjacent portions of the blank.

As the male mold die continues in its downward movement for effecting molding operations, the extended portion 26 of the female mold die 30 and the blank pressed thereon by the male mold die are forced together downwardly in opposition to the spring members. During continued movement of the die parts downwardly to effect molding operations, the movable part 26 is actuated to its retracted position of adjustment and the side wall portions and the flanged portions 22 and 24, respectively, of the mold tray are formed by cooperative reaction between the mold surface 32 and 33 of the female mold part with the mold surfaces 21 and 23 of the male mold part to effect the desired molding operation.

After the molding operations have been completed and the die parts are retracted from molding relation, the compression springs become effective again to force the separate portion 26 of the female mold 30 to extended position. This movement of the mold part functions as a knock-out pin to raise the molded tray 10 to position where access is readily available for removal. Knock-out pins may be provided for operation through the male mold surface upon return of the die part to release the molded tray in the event that it is carried therewith.

It will be understood that numerous changes may be made in the details of construction, arrangement, and operation without departing from the spirit of the invention, especially as defined in the following claim.

I claim:

A die assembly for molding a fibrous sheet into a partitioned plate or the like having side walls about a bottom wall portion with upstanding partition ribs therein, said die assembly comprising, in combination, a male die having a projecting molding portion with solid side and bottom elements and corresponding in shape to the inside of the plate to be molded, a female die having a molding cavity therein with a side element corresponding in shape to the side of the plate to be molded, said projecting molding portion of said male die being movable into and out of said molding cavity in said female die, said female die having a recess therein at the bottom of said cavity, a bottom molding plate movable downwardly and upwardly into and out of said recess and having an upper portion corresponding in shape to the bottom of the plate to be molded, resilient means acting between said female die and said bottom molding plate and normally positioning said bottom molding plate with said upper portion thereof projecting substantially above the upper extremity of said female die, said upper portion of said bottom molding plate having upstanding rib elements thereon corresponding in shape to the partition ribs in the plate to be molded, said bottom elements of said male die having groove elements therein for receiving said rib elements on said bottom molding plate for molding the partition ribs, said male and female dies being movable toward each other with the fibrous sheet therebetween, said bottom molding plate and said bottom element on said male die being effective to engage the sheet and to mold the partition ribs during initial approaching movement of said male and female dies before said dies close upon the sheet, said resilient means thereupon being yieldable to provide for movement of said bottom molding plate into said recess and further to provide for closure of said dies upon the sheet to mold the side walls of the plate.

References Cited in the file of this patent

UNITED STATES PATENTS

| Number | Name | Date |
|---|---|---|
| 164,520 | Chalmers | June 15, 1875 |
| 949,957 | Falk | Feb. 22, 1910 |
| 999,303 | Falk | Aug. 1, 1911 |
| 1,029,488 | Burghoff et al. | June 11, 1912 |
| 1,072,915 | Cook et al. | Sept. 9, 1913 |
| 1,227,534 | Frankland | May 22, 1917 |
| 1,253,316 | Weiland | Jan. 15, 1918 |
| 1,598,911 | Hochmuth et al. | Sept. 7, 1926 |
| 1,668,349 | Baum | May 1, 1928 |
| 1,856,319 | Cooper | May 3, 1932 |
| 1,879,555 | Simmons | Sept. 27, 1932 |
| 2,221,197 | Martin | Nov. 12, 1940 |